Nov. 8, 1938.  H. A. FLADER  2,135,889
CONNECTER FOR PRESSURE LINES
Filed Sept. 24, 1935
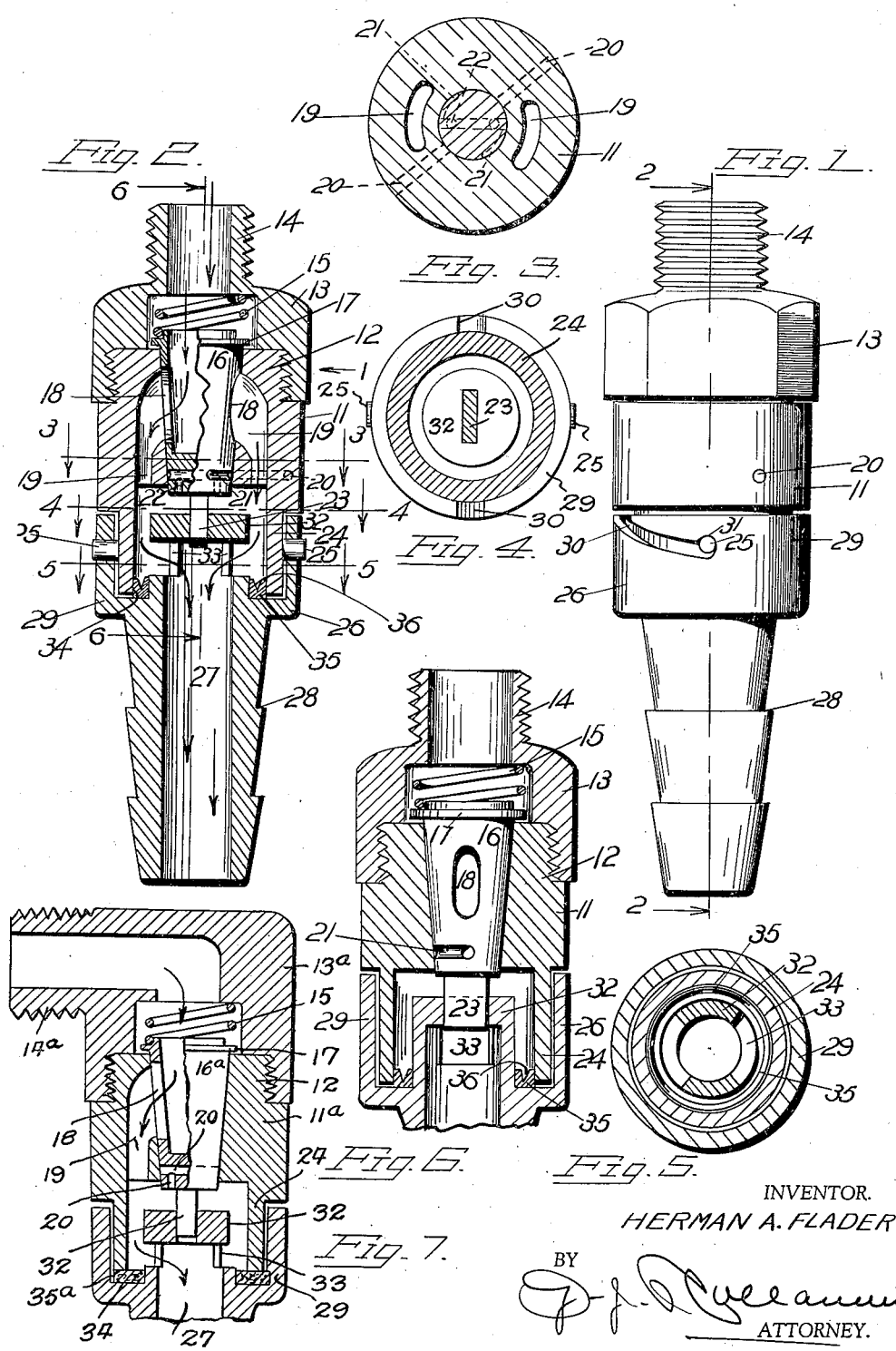
INVENTOR.
HERMAN A. FLADER
BY
ATTORNEY.

Patented Nov. 8, 1938

2,135,889

UNITED STATES PATENT OFFICE 2,135,889

CONNECTER FOR PRESSURE LINES

Herman A. Flader, Denver, Colo.

Application September 24, 1935, Serial No. 41,887

6 Claims. (Cl. 284—19)

This invention relates to improvements in combined valves and connecters of the type employed in making connection between a fluid storage tank and a hose or distributing pipe.

In many places, but particularly in places where compressed air is extensively employed, it is often desirable to connect an air hose to the air supply and thereafter to disconnect the same. Various quick detachable connecters have been invented for use with compressed air, and other fluids, which, however, require a separate valve to be interposed between the air supply and the corresponding portion of the connecter.

It is the object of this invention to provide a quick detachable coupling in which the part that is connected with the air supply shall be provided with a valve that will close automatically when the hose is disconnected and open automatically when the connection is made.

The above and other objects of this invention which may appear as the description proceeds, are attained by means of a construction and an arrangement of parts that will now be described in detail, and for this purpose reference will be had to the accompanying drawing in which the invention has been illustrated in its preferred form, and in which:

Figure 1 is a side elevation showing the connecter in operating position;

Figure 2 is a longitudinal diametrical section taken on line 2—2, Figure 1;

Figure 3 is a transverse section taken on line 3—3, Figure 2;

Figure 4 is a transverse section taken on line 4—4, Figure 2;

Figure 5 is a transverse section taken on line 5—5, Figure 2;

Figure 6 is a longitudinal diametrical section taken on line 6—6, Figure 2; and

Figure 7 is a section, similar to that shown in Figure 2, but showing a slightly modified construction.

The body of the valve has been designated by numeral 11, and has a threaded section 12 of reduced diameter to which the cap 13 is threadedly connected. The cap has a threaded projection or hub 14 with which connection is made to one end of a pipe whose other end is connected with a source of fluid under pressure, either a liquid or a gas, (not shown). The cap has an enlarged recess for the reception of a spring 15.

The body member has an axial opening whose side surface is frusto-conical and in which is positioned the frusto-conical plug 16. The opening in which the plug is seated is downwardly tapered and the upper end of the plug has a flange 17 forming a shoulder on which the lower end of spring 15 rests. The plug is hollow, and is provided with diametrically opposed openings 18 that communicate with the ports 19 when the plug is in one position.

The body member 11 is also provided with a vent opening 20 that is in communication with the groove 21 in the outer surface of the plug when the latter is in closed position. Openings 22 connect the groove 21 with the outside of the plug. The lower end of the plug is provided with a flattened projection 23 whose function will appear as the description proceeds. The lower end of the body member has a portion or skirt 24 of reduced diameter, and this is provided with two oppositely positioned pins 25.

A connecter element 26 is provided with a central opening 27 and has the outer surface of the lower tubular end thereof provided with annular ribs 28 which cooperate with the inner surface of a hose (indicated by dotted lines in Figure 2). The upper end of the connecter element has an enlarged cylindrical recess whose wall 29 telescopes over the skirt 24 of the body member, as shown in Figure 2, and which is provided with two oppositely located bayonet slots 30 whose inner ends are provided with locking notches 31.

The connecter element has a central tubular projection 32 whose wall is provided with one or more openings 33. The upper end of the projection 32 has an elongated opening for the reception of the projection 23 on the lower end of the plug.

The bayonet slots 30 extend an angular distance of 90° and the length of the projection 23 is such that it must enter the opening in the projection 32 before the pins 25 can enter the slots 30, and therefore the plug will be turned 90° in the direction tending to bring the ports 18 into register with ports 19, during the time that the pins pass along the slots 30 to the notches 31, and a corresponding angular distance during the disconnecting movement of part 26. The result of this is that the valve will always be closed when the parts are disconnected, and open when they are connected.

It will be observed that the lower end of the skirt 24 of the body member projects into an annular groove 34 which is wider than the thickness of the skirt. A rubber sealing ring 35 is positioned between the inside surface of the skirt and the inner wall of the groove. The upper surface of the washer has a V-shaped groove 36. The pressure fluid, acting on the walls of the groove 36 forces the sides of the washer outwardly against the sides of the groove and skirt, thus forming a seal.

Owing to the presence of the locking notches 31, the parts will separate slightly when they reach the position shown in Figure 1, and for this reason a compression gasket will have the pressure thereon decreased at the final position of the parts which may permit leakage. A compression gasket may be used with satisfactory results, if it has the proper resiliency.

The function of the opening 22, the groove 21 and the vent 20 is to permit the discharge hose to deflate before the bayonet joint is disconnected, thereby preventing any dangerous sudden movement of the parts when they are separated.

In Figure 7 a slightly modified form of the invention has been illustrated. The principal difference between the embodiment shown in Figure 2 and that shown in Figure 7 is that in the latter the threaded tubular projection 14a projects at right angles and only single ports 18 and 19 are provided.

The gasket 35a is a compression gasket positioned between the end of the skirt and the bottom of the groove 34, instead of the arrangement shown in Figure 2. Since the other feaures are substantially identical with those shown in Figure 2, and already described, no further description will be made of this device.

From the foregoing, it will be seen that by means of the simple arrangement and relationship of parts shown and described, the ends of air pipes in mines and other places where compressed air is employed, as well as the ends of water pipes like those provided for lawn irrigation, can be provided with a connecter assembly comprising the body member with its valve mechanism, and the delivery conduit or hose can be provided with the connecter element. When the hose or delivery conduit is detached, the valve at the end of the fluid pressure conduit will always be in closed position because the parts are so related that they cannot be separated until the valve is closed. In this way the danger that the ordinary valves or stop-cocks employed for this purpose may be left in partly closed position, or accidentally opened, will be averted. When the hose or delivery conduit is attached, the valve will be automatically moved to open position.

Having described the invention, what is claimed as new is:

1. A quick-coupling connecter for uniting separable members of a pressure-fluid conductive system, comprising a housing on one of the said members, a hollow plug rotatable in the housing, the plug being open at one end, in constant communication with and to receive pressure fluid from the said member, and provided with a discharge port, there being a fluid conductive passage in the housing in conductive register with the port of the plug at one position in its rotation, a fluid-conducting element on the second separable member, adapted for sealing engagement with the housing by relative rotative movement of such second member, and means on the said element engaging the plug for rotating the same to the position of register of the port with the passage simultaneously with the sealing-engagement movement of the said second member relative to the housing.

2. A separable valve-connecter for effecting a conductive connection between separable members of a pressure-fluid conductive system comprising, a housing attached to one of the members and open to receive fluid, a tapered rotatable spring-pressed valve-plug in the housing having its larger end open to the pressure-fluid to facilitate seating thereof and to provide a fluid passage therethrough, a wall of the housing having a by-pass in conductive register with the passage, means carried by the second member, adapted to effect a sealed union of the housing and second member by relative rotary movement, and to conduct by-passed fluid, and means carried by the said second member, engaging the valve-plug and adapted to impart thereto a similar rotary movement during the rotary sealing movement, whereby the conductive register of the passage with the by-pass is varied.

3. A separable connecter for effecting a union between a conduit containing a fluid under pressure and a delivery conduit, comprising in combination, a body member having an opening, means at one end thereof for making a connection with the fluid pressure conduit, a hollow plug mounted in the opening for rotary movement, the plug and the wall of the opening having ports that communicate with each other in one relative rotary position, to permit fluid to flow therethrough, resilient means engaging the larger end of the plug for holding it in operative position, a tubular connecter element having means at one end, for engaging cooperating means at the discharge end of the body member to effect a sealed connection by a relative rotary movement of the two members, and cooperating means on the plug and on the connecter element for imparting to the plug a simultaneous rotary movement corresponding to the rotary movement of the connecter element.

4. A separable connecter for effecting a union between a conduit containing a fluid under pressure and a delivery conduit, comprising in combination, a body member having an opening, means at one end thereof for making a connection with the fluid pressure conduit, a hollow plug mounted in the opening for rotary movement, the plug and the wall of the opening having ports that communicate with each other in one relative rotary position, to permit fluid to flow therethrough, the larger end of the plug being open and in communication with the pressure receptacle, resilient means engaging the larger end of the plug for holding it in operative position, a tubular connecter element having means at one end, for engaging cooperating means at the discharge end of the body member to effect a sealed connection by a relative rotary movement of the two members, the small end of the plug having a non-circular extension at the discharge end of the body member, a tubular connecter element, means comprising a bayonet joint for interconnecting the body member and the connecter element by a relative rotary movement, the connecter element having a central projection provided with a non-circular opening for the reception of the non-circular projection on the plug, to effect simultaneous and equal rotation of the two parts.

5. A separable connecter for effecting a connection between a conduit containing a fluid under pressure and a delivery conduit, comprising in combination, a body member having a tapering opening therethrough, means for making a connection between the pressure conduit and the end of the body member having the larger diameter of the opening, a port extending from a point in the wall of the opening to the end of the body member having the smaller diameter opening; a hollow tapered plug in the opening, the plug having a port which registers with the port in the wall of the opening at one rotary position thereof, the plug having a non-circular extension at its smaller end, resilient means comprising a spring, engaging the larger end of the plug to urge it into the opening, a tubular connecter element, the body member and the connecter element being provided with cooperating elements forming a bayonet joint for effecting a sealed connection between the two parts by a partial rotary movement, and means carried by the connecter element and provided with a non-circular opening, for engaging the non-circular projection on the plug for rotarily interconnecting the plug and connecter element.

6. A separable connecter for effecting a connection between a conduit containing a fluid under pressure and a delivery conduit, comprising in combination, a body member provided with an opening, means for securing the same to a fluid pressure conduit, a valve mechanism carried by the body member for controlling the flow of fluid through the opening, a tubular connecter element provided at one end with means for making connection with a delivery conduit, the other end having means for cooperating with a complementary means on the body member for effecting a sealed connection between the two by relative rotation of the parts, means for opening the valve when the connecter element is attached to the body member and for closing the valve when the connecter element is separated from the body member, the body member having a vent opening, the valve mechanism having means for effecting a connection between the delivery pipe and the vent opening when the valve mechanism is in closed position and for closing said passage when the valve mechanism is in open position.

HERMAN A. FLADER.